(12) United States Patent
Wang (10) Patent No.: US 9,036,989 B2
(45) Date of Patent: May 19, 2015

(54) APPARATUS AND METHOD FOR REROUTING MULTIPLE TRAFFICS

(75) Inventor: Jiayu Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 745 days.

(21) Appl. No.: 13/394,154

(22) PCT Filed: May 21, 2010

(86) PCT No.: PCT/CN2010/073082
§ 371 (c)(1),
(2), (4) Date: Mar. 5, 2012

(87) PCT Pub. No.: WO2011/026350
PCT Pub. Date: Mar. 10, 2011

(65) Prior Publication Data
US 2012/0163797 A1    Jun. 28, 2012

(30) Foreign Application Priority Data
Sep. 3, 2009  (CN) .......................... 2009 1 0170118

(51) Int. Cl.
*H04B 10/08* (2006.01)
*H04L 12/26* (2006.01)
(Continued)

(52) U.S. Cl.
CPC ............... *H04L 45/22* (2013.01); *H04L 12/26* (2013.01); *H04L 45/02* (2013.01); *H04L 45/28* (2013.01); *H04J 14/0257* (2013.01); *H04J 14/0267* (2013.01); *H04J 14/0268* (2013.01)

(58) Field of Classification Search
CPC .. H04J 14/0257; H04J 14/0267; H04L 45/02; H04L 45/00
USPC .................................. 398/1, 2; 370/225, 228
See application file for complete search history.

(56) References Cited

U.S. PATENT DOCUMENTS

| 7,324,453 B2* | 1/2008 | Wu et al. ........................ 370/238 |
| 2007/0174483 A1* | 7/2007 | Raj et al. ....................... 709/238 |

(Continued)

FOREIGN PATENT DOCUMENTS

| CN | 1960341 A | 5/2007 |
| CN | 101141195 A | 3/2008 |

(Continued)

OTHER PUBLICATIONS

International Search Report in international application No. PCT/CN2010/073082, mailed on Sep. 2, 2010.

(Continued)

*Primary Examiner* — Oommen Jacob
(74) *Attorney, Agent, or Firm* — Oppedahl Patent Law Firm LLC (57) ABSTRACT

The disclosure discloses an apparatus and method for rerouting multiple traffics. The apparatus includes a path computation unit and a traffic path incorporation unit, the path computation unit forwards a received uniform route computation notification message including multiple pieces of failed traffic connection information to the traffic path incorporation unit, and also forwards a route inquiry request transmitted from the head node of the fault traffic to the traffic path incorporation unit; the traffic path incorporation unit analyzes and detects the failed traffic connection information according to traffic incorporating and route inquiry statistic algorithm, and uniformly obtains and records the recovery route information from the path computation unit; when receiving the route inquiry request forwarded by the path computation unit, the traffic path incorporation unit is further configured to search the record according to the route inquiry request, and return the found corresponding recovery route information to the head node which requests the recovery through the path computation unit. The disclosure uses a incorporating and uniform route inquiry method, the resource loss of the path computation unit is reduced, and the efficiency of link restoration is improved.

22 Claims, 3 Drawing Sheets (51) Int. Cl.
*H04L 12/707* (2013.01)
*H04J 14/02* (2006.01)
*H04L 12/751* (2013.01)
*H04L 12/703* (2013.01)

(56) References Cited

U.S. PATENT DOCUMENTS

2009/0225650 A1* 9/2009 Vasseur .................. 370/218
2009/0285101 A1* 11/2009 Lu ........................... 370/238
2010/0214909 A1* 8/2010 Ceccarelli et al. ....... 370/228
2012/0163797 A1* 6/2012 Wang ....................... 398/2
2013/0246593 A1* 9/2013 Bryskin et al. ........... 709/223

FOREIGN PATENT DOCUMENTS

| CN | 101286892 A | 10/2008 |
| CN | 101651625 A | 2/2010 |
| EP | 1981221 A1 | 10/2008 |
| EP | 2464036 A1 * | 6/2012 |
| WO | 2008037161 A1 | 4/2008 |
| WO | WO 2008037161 A1 * | 4/2008 |

OTHER PUBLICATIONS

English Translation of the Written Opinion of the International Search Authority in international application No. PCT/CN2010/073082, mailed on Sep. 2, 2010.

* cited by examiner

Fig. 4 under control of route selection and signaling, Automatic Switched Optical Network (ASON) is a study hotspot of the optical network field in recent years.
APPARATUS AND METHOD FOR REROUTING MULTIPLE TRAFFICS

TECHNICAL FIELD

The disclosure relates to the technical field of communications and, more particularly to apparatus and methods for rerouting multiple traffics.

BACKGROUND

As a new generation optical network which completes automatic switching function under control of route selection and signaling, Automatic Switched Optical Network (ASON) is a study hotspot of the optical network field in recent years. The introduction of ASON technology can enhance the quick configuration capability of network traffics, improve the survivability of traffics, effectively resist against network multipoint fault, and flexibly provide different traffic levels to meet the demands of rapidly developing customized traffics at present.

The Path Computation Element (PCE) in ASON enables the path computation function to be independent from network equipment, that is, an independent PCE is arranged in a network to solve the problem of special resources required by a large amount of lines in a Multiple Protocol Label Switching/Generalized Multi-protocol Label Switching (MPLS/GMPLS) due to constrained path computation. As the PCE has to compute the route computation and path resource selection requested by each fault traffic which needs the recovery of rerouting one by one, particularly in a case that a large amount of traffics request the fault recovery route computation simultaneously, delay of traffic recovery may be caused as the PCE is too busy to respond requests in time.

SUMMARY

In consideration of above analysis, the disclosure is aimed at providing apparatus and methods for rerouting multiple traffics to solve the problem that delay of traffic recovery may be caused as the PCE is too busy to respond requests in time in the related technologies.

The purpose of the disclosure is realized through the following technical solution:

the disclosure provides an apparatus for rerouting multiple traffics, the apparatus comprises: a path computation unit and a traffic path incorporation unit, wherein the path computation unit is configured:

to forward, to the traffic path incorporation unit, a received uniform route computation notification message including information about a plurality of failed traffic connections; and to forward, to the traffic path incorporation unit, a route inquiry request sent by a head node of a failed traffic during a traffic failure inquiry period;

the traffic path incorporation unit is configured:

to receive the uniform route computation notification message forwarded by the path computation unit, to incorporate the plurality of failed traffic connections according to a traffic incorporation and route inquiry statistic algorithm, to obtain, from the path computation unit, updated routes with respect to the plurality of failed traffic connections as incorporated, and to store records of the updated routes; and based on the received route inquiry request forwarded by the path computation unit, to search the records to find a corresponding updated route, and to return, through the path computation unit, the found updated route to the head node requesting route restoration.

Further, the apparatus may further comprise: a traffic failure reporting unit arranged in a node of an automatic switched optical network, configured to, when detecting a multiplexing alarm occurs at a transmission port of the node, determine whether a number of the plurality of failed traffic connections is larger than a predetermined threshold, and when determining that the number of the failed traffic connections is larger than the predetermined threshold, to send, to the path computation unit, a uniform route computation notification message including information about the plurality of failed traffic connections.

Further, the path computation unit may comprise a message forwarding module, a route inquiry request forwarding module and an updated route information forwarding module, wherein the message forwarding module is configured to forward, to the traffic path incorporation unit, the received uniform route computation notification message including information about the plurality of failed traffic connections, and at the same time, to set the route computation state of the path computation unit as traffic-failure-route-inquiry;

the route inquiry request forwarding module may be configured:

to receive the route inquiry request sent by the head node of the failed traffic; and to determine the current route computation state of the path computation unit, and when determining the path computation unit is currently in a route computation state of traffic-failure-route-inquiry, then to forward, to the traffic path incorporation unit, the route inquiry request reported by the head node, otherwise to trigger the path computation unit to directly compute a corresponding updated route according to the received route inquiry request;

the route information forwarding module is configured to forward, to the head node requesting route restoration, the updated route found by the traffic path incorporation unit according to the route inquiry request.

Further, the traffic path incorporation unit may comprise a storage module, a route restoration module and an inquiry module, wherein the storage module is configured to separate, from the uniform route computation notification message, information about all the failed traffic connection, and store the failed traffic connections in a hash table with source and destination nodes of the failed traffic connections as key values;

the route restoration module is configured to take out the key values from the hash table, and to respectively execute the following processing for each key value:

to request the path computation unit to return an updated route including all available wavelengths, to assign each failed traffic connection a wavelength, and to fill the updated route in a route restoration record field of each failed traffic connection in the hash table;

the inquiry module is configured to search the hash table according to the route inquiry request forwarded by the path computation unit, and when a corresponding failed traffic connection is found, to return, through the path computation unit, an updated route corresponding to the failed traffic connection to corresponding head nodes.

Further, the storage module may be specifically configured to separate all pieces of failed traffic connection information in the uniform route computation notification message one by one, and, according to the route policy attribute in the fault connection information, store the source and destination nodes of failed traffic connections with non-route policy attribute and weak-route policy attribute in a hash table structure as key values.

Further, the route restoration module may be specifically configured to in turn take out key values from the hash table by using the source and destination nodes of failed traffic connections as key values, and to respectively execute the following processing for each key value:

to inquire a route from the path computation unit and to request the path computation unit to return one route including all available wavelengths; to analyze according to the route returned by the path computation unit, to determine whether the quantity of available wavelengths on the route is larger than or equal to the quantity of failed traffic connections under the key values, if yes, assign and analyze the route and wavelengths, and to fill the route into the recovery route record field of each failed traffic connection in the hash table according to the priority of failed traffic connections; otherwise, to continue to inquire a route from the path computation unit and to request the path computation unit to return another route including all available wavelengths, until the quantity of available wavelengths on the route is larger than or equal to the quantity of failed traffic connections under the key values, or until there is no route.

Further, the inquiry module may be configured to search the hash table according to the route inquiry request forwarded by the path computation unit, and when a corresponding failed traffic connection is found, to return a corresponding updated route to the path computation unit.

The disclosure further provides a method for rerouting multiple traffics, comprising:

step A, a path computation unit forwarding, to a traffic path incorporation unit, a received uniform route computation notification message including information about a to plurality of failed traffic connections;

step B, the traffic path incorporation unit receiving the uniform route computation notification message including information about the plurality of failed traffic connections, incorporating the plurality of failed traffic connections according to a traffic incorporation and route inquiry statistic algorithm, and obtaining, from the path computation unit, updated routes with respect to the plurality of failed traffic connections as incorporated, and storing records of the updated routes;

step C, during a traffic failure inquiry period, the traffic path incorporation unit forwarding, to the traffic path incorporation unit, a route inquiry request sent by a head node of a failed traffic, and the traffic path incorporation unit, based on the received route inquiry request, searching the records to find a corresponding updated route, and returning, through the path computation unit, the found updated route to the head node requesting route restoration.

Further, Step A may specifically comprise:

step A1, when a link in an automatic switched optical network fails, a node corresponding to the failed link determining whether a number of failed traffic connections is larger than a predetermined threshold, and when determining that the number of the failed traffic connections is larger than the predetermined threshold, to execute step A2;

step A2, sending, to the path computation unit, a uniform route computation notification message including information about the failed traffic connections;

step A3, the path computation unit forwarding, to the traffic path incorporation unit, the received uniform route computation notification message, and at the same time, to setting its own route computation state as traffic-failure-route-inquiry.

Further, Step B may specifically comprise:

Step B1, the traffic path incorporation unit separating, from the uniform route computation notification message, information about all the failed traffic connection, and storing the failed traffic connections in a hash table with source and destination nodes of the failed traffic connections as key values;

Step B2, the route restoration module taking out the key values from the hash table, and respectively executing the following processing for each key value:

requesting the path computation unit to return an updated route including all available wavelengths, assigning each failed traffic connection a wavelength, and filling the updated route in a route restoration record field of each failed traffic connection in the hash table.

Further, Step B1 may specifically comprise:

the traffic path incorporation unit separating, from the uniform route computation notification message, information about all the failed traffic connection, and, according to route policy attributes of the failed traffic connections, storing failed traffic connections with non-route policy attributes and failed traffic connections with weak-route policy attributes in the hash table, with the source and destination nodes of those failed traffic connections as key values.

Further, Step B2 may specifically comprise:

taking out the key values from the hash table, and to respectively execute the following processing for each key value:

requesting the path computation unit to return an route including all available wavelengths;

analyzing the route returned by the path computation unit to determine whether a number of the available wavelengths of the route is larger than or equal to a number of failed traffic connections associated with the key value, if yes, then executing a route and wavelength assignment analysis, and filling the route into updated route record field of each failed traffic connection in the hash table according to priority of those failed traffic connections; otherwise, continuing to request the path computation unit to return another route including all available wavelengths, until a number of available wavelengths of the another route is larger than or equal to the number of failed traffic connections associate with the key value, or until there is no route.

Further, Step C may specifically comprise:

C1, when the head node of the failed traffic starts to request route restoration, the path computation unit, if being in a traffic-failure-route-inquiry state, forwarding the route inquiry request reported by the head node to the traffic path incorporation unit and executing step C2; otherwise, directly computing an updated route according to the received route inquiry request;

C2, the traffic path incorporation unit searching to find a corresponding failed traffic connection according to the route inquiry request, and returning, through the path computation unit, the found updated route associated with the failed traffic connection to the head node requesting restoration.

The disclosure has the following beneficial effects:

the disclosure uses a method of incorporating all traffics which can use same path and then uniformly executing route computation for these traffics, to realize the purpose of reducing resource consumption of the PCE and improve the efficiency of link restoration.

Other features and advantages of the disclosure will be described in the following description, and will be partially apparent from the description, or known through the implementation of the disclosure. The purpose and other advantages of the disclosure may be realized and obtained through the structures especially pointed in the description, claims and drawings.

DETAILED DESCRIPTION

The present inventor has recognized that, when multiple traffics fail concurrently and need to be rerouted, incorporating those traffics into at least one group, each group including, of all the traffics, those with the same path and then rerouting each group respectively, can reduce consumption of PCE resources and improve the efficiency of link restoration.

The preferred embodiment of the disclosure will be specifically described below in conjunction with drawings, wherein the drawings form one part of the application and are used for explaining the principle of the disclosure together with the embodiment of the disclosure. To make the purpose clear and simple, the detailed specific description of known functions and structures of components described in the text will be omitted when they may cause the subject of the disclosure ambiguous.

First, an apparatus according to an embodiment of the disclosure will be described in details in conjunction with FIG. 1 and FIG. 2.

Figure 1:
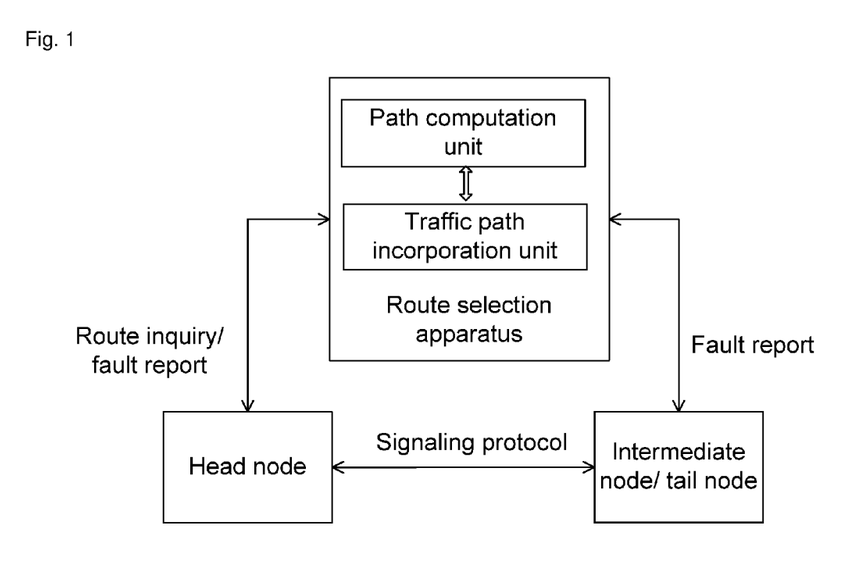
FIG. 1 illustrates an application scenario of a rerouting apparatus according to an embodiment of the disclosure.

FIG. 1 illustrates an application scene diagram of the route selection apparatus in the embodiment of the disclosure, when the multiplexing section of the automatic switched optical network has a fault and sends an alarm, the fault node of the traffic link counts the quantity of failed traffic connections, and notifies the uniform route computation notification message including multiple failed traffic connections to the route selection apparatus, and simultaneously, notifies the fault situation to the head node of failed traffic connections through a signaling protocol, so that the head node decides to initiate a recovery route request; the route selection apparatus executes incorporating and route inquiry processing according to the uniform route computation notification message, and returns the obtained recovery route information to the head node when the head node initiates the recovery route request.

Figure 2:
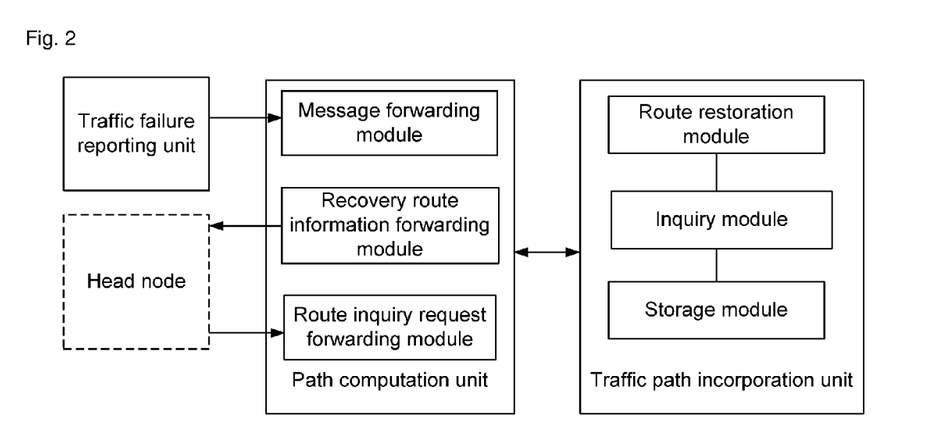
FIG. 2 illustrates a structure diagram of a rerouting apparatus according to an embodiment of the disclosure.

As shown in FIG. 2, FIG. 2 illustrates a structure diagram of the route selection apparatus in the embodiment of the disclosure. The route selection apparatus comprises: a traffic failure reporting unit, a path computation unit and a traffic path incorporation unit, wherein the path computation unit specifically comprises: a message forwarding module, a route inquiry request forwarding module and a recovery route information forwarding module; and the traffic path incorporation unit specifically comprises: a storage module, a route restoration module and an inquiry module.

Each unit and module will be described in details below, respectively.

(I) Traffic failure reporting unit: the traffic failure reporting unit is arranged in the node of the automatic switched optical network, when the multiplexing section of the automatic switched optical network has a fault and sends an alarm, the corresponding node of the fault link searches for failed traffic connections existed at the fault port, determines whether the quantity of failed traffic connections is larger than the predetermined threshold, and sends the uniform route computation notification message including multiple pieces of fault connection information to the path computation unit when determining that the quantity of failed traffic connections is larger than the predetermined threshold. The predetermined threshold is generally determined according to the maximum load capacity of the path computation unit, in order to guarantee the reasonable workload of the path computation unit.

(II) Path computation unit: the path computation unit is mainly responsible for forwarding messages, for example, forwarding the received uniform route computation notification message including multiple pieces of failed traffic connection information to the traffic path incorporation unit; during traffic fault inquiry period, the path computation unit is also configured to forward the route inquiry request transmitted by the head node of the fault traffic to the traffic path incorporation unit; and the path computation unit is also responsible for executing recovery route computation according to the route inquiry request. The recovery route computation function already has mature solutions in the conventional art and will not be described in details herein.

The path computation unit specifically comprises: a message forwarding module, a route inquiry request forwarding module and a recovery route information forwarding module, wherein the message forwarding module forwards the uniform route computation notification message to the traffic path incorporation unit when receiving the uniform route computation notification message including multiple pieces of fault connection information from the traffic failure reporting unit in the corresponding node of the fault link, and simultaneously sets the route computation state of the path computation unit as traffic fault inquiry state;

when the head node of the fault traffic initiates a route inquiry request to the path computation unit, the route inquiry request forwarding module receives the route inquiry request, determines the current route computation state of the path computation unit, if the route computation state of the path computation unit is traffic fault route inquiry state, forwards the route inquiry request reported by the head node of the fault traffic to the traffic path incorporation unit; otherwise, that is, the route computation state of the path computation unit is non-traffic fault route inquiry state, triggers the path computation unit to directly execute route recovery computation for the received route inquiry request, and returns the computed recovery route information to the head node which requests the recovery, and no forwarding is executed;

when the traffic path incorporation unit find the corresponding recovery route information according to the forwarded route inquiry request, the route information forwarding module forwards the recovery route information, which is found by the traffic path incorporation unit according to the route inquiry request, to the head node which requests the recovery.

(III) Traffic path incorporation unit: the traffic path incorporation unit is mainly responsible for two aspects, one of which is to receive the uniform route computation notification message, which is transmitted by the path computation unit and which includes multiple pieces of fault connection information, execute incorporating and route inquiry processing for all fault connections in the message, and then uniformly obtain and record the route information from the path computation unit; the other aspect is to, when receiving the route inquiry request transmitted by the path computation unit, search the record according to the route inquiry request, and return the found corresponding recovery route information to the head node which requests the recovery through the path computation unit.

The traffic path incorporation unit may specifically comprise: a storage module, a route restoration module and an inquiry module, wherein the storage module receives the uniform route computation notification message, which is transmitted by the path computation unit and which includes multiple pieces of fault connection information, separates all failed traffic connections in the uniform route computation notification message one by one, and stores the source and destination nodes of failed traffic connections in a hash table structure as key values;

the route restoration module takes out the key values from the hash table, and respectively executes the following processing for each key value:

inquires a route from the path computation unit and requests the path computation unit to return one route including all available wavelengths, assigns the wavelength for each failed traffic connection, and in turn fills the route into the recovery route record field of each failed traffic connection in the hash table. Specifically, the route restoration module inquires a route from the path computation unit and requests the path computation unit to return one route including all available wavelengths; then analyzes according to the route returned by the path computation unit, determines whether the quantity of available wavelengths on the route is larger than or equal to the quantity of failed traffic connections under the key values, if yes, executes Routing and Wavelength Assignment (RWA) analysis, assigns the wavelength for each failed traffic connection, and in turn fill the route into the recovery route record field of each failed traffic connection in the hash table according to the priority of failed traffic connections, simultaneously, returns wavelengths which are not used to the path computation unit to release resources; otherwise, continues to inquire a route from the path computation unit and requests the path computation unit to return another route including all available wavelengths, until the quantity of available wavelengths on the route is larger than the quantity of failed traffic connections under the key values, or until there is no route.

The inquiry module searches the hash table structure according to the route inquiry request transmitted by the path computation unit, and returns the recovery route information corresponding to the failed traffic connection to the corresponding head node through the path computation unit when the corresponding failed traffic connection is found. Specifically, the inquiry module searches the hash table structure according to the route inquiry request transmitted by the path computation unit, determines whether the recovery route information has been computed for the failed traffic connection if the corresponding failed traffic connection is found, if yes, returns the corresponding recovery route information to the path computation unit, otherwise enters the waiting state until it exists because it computes the recovery route information or it is failed in the recovery route computation or the recovery route computation is overtime; if no corresponding failed traffic connection is found, directly notifies the path computation unit to execute route recovery computation.

The specific implementation process of the apparatus for rerouting multiple traffics in the embodiment of the disclosure will be described in details below in the description of the method and will not be explained too much herein.

Now, a rerouting method based on the above apparatus for rerouting multiple traffics will be described below with reference to FIG. 3 and FIG. 4.

Figure 3:
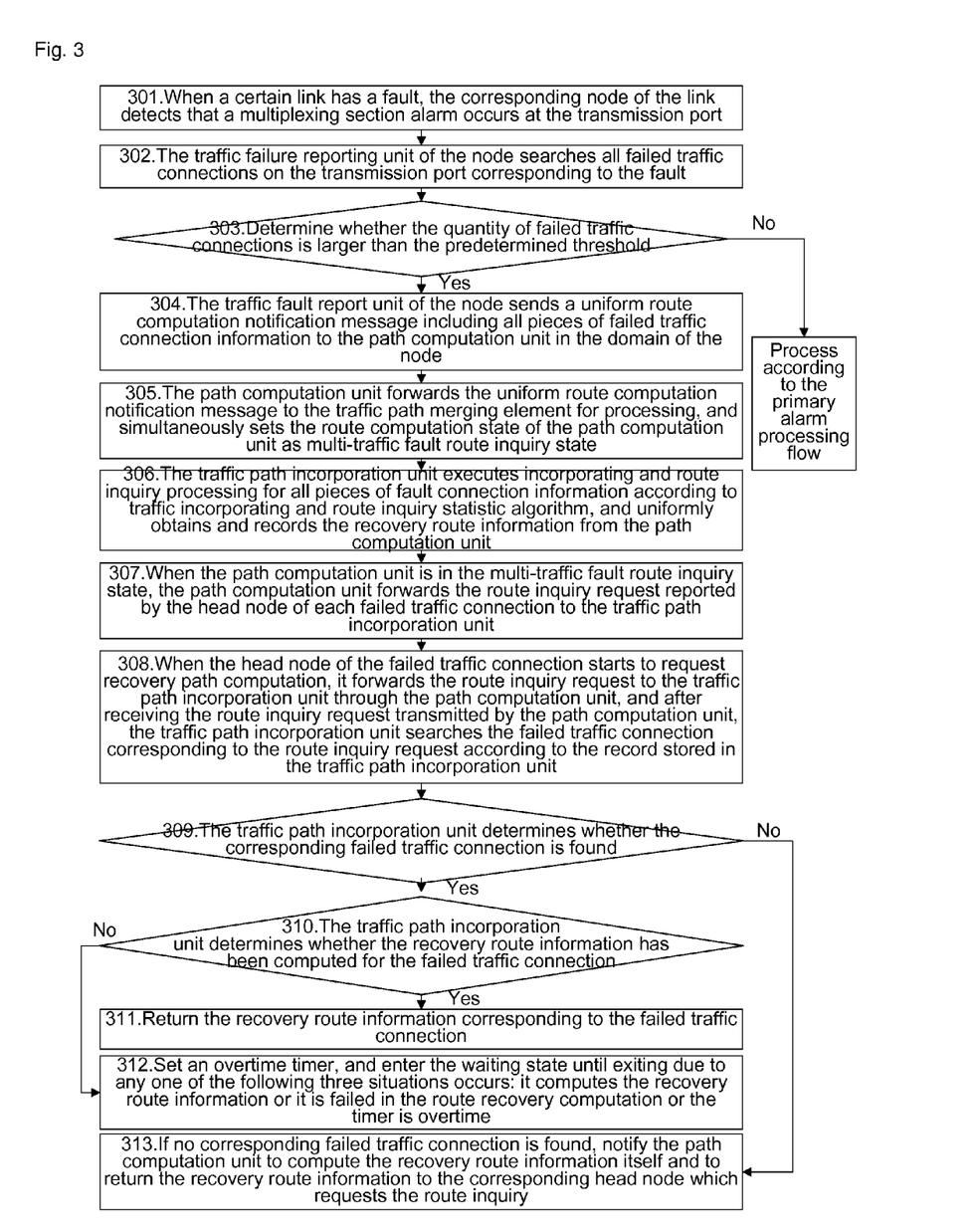
FIG. 3 illustrates a flow diagram of a rerouting method according to an embodiment of the disclosure.

FIG. 3 illustrates a flow diagram of a method for rerouting multiple traffics according to an embodiment of the disclosure. As shown in FIG. 3, the method comprises the following steps S301-313, but does not limited to those steps.

S301, when a link fails, an end node, corresponding to the link, detects a multiplexing section alarm occurs at a transmission port.

S302, a traffic failure reporting unit included in the end node searches out all failed traffic connections presented on the transmission port corresponding to the failure.

S303 includes to determine whether the number of the failed traffic connections is larger than a predetermined threshold, if yes, then to execute S304; otherwise to execute an existing alarm processing. The said existing alarm processing is to notify, head nodes of the failed traffics, of the failed traffic connections, so that head nodes of the failed traffics each can initiate a reroute computation request with a path computation unit. Generally, said predetermined threshold is determined according to maximum load capacity of the path computation unit to keep a reasonable workload for the path computation unit.

S304, the traffic failure reporting unit included in the end node sends, to the path computation unit in the domain of the end node, a uniform reroute computation notification message including information about all the failed traffic connections.

S305, the path computation unit forwards to, a traffic path incorporation unit, the uniform reroute computation notification message, and at the same time sets its own route computation state as multiple-failed-traffics-route-inquiry.

S306, the traffic path incorporation unit, according to a traffic incorporation and route inquiry statistic algorithm, incorporates all the failed traffics and initiates a reroute inquiry with the path computation unit to obtain updated routes with respect to the failed traffics as incorporated, and records information about obtained updated routes.

S307, when being in the multiple-failed-traffics-route-inquiry state, the path computation unit forwards, to the traffic path incorporation unit, a route inquiry request reported by a head node of a failed traffic connection;

In S307, when receiving a route inquiry request from the traffic path incorporation unit, the path computation unit executes a normal process to return a computation result to the traffic path incorporation unit. When not being in the multiple-failed-traffics-route-inquiry state and receiving a route inquiry request reported by a head node of a failed traffic connection, the path computation unit executes a normal rerouting computation.

S308, when starting to request a reroute computation, the head node of the failed traffic connection forwards a route inquiry request to the traffic path incorporation unit through the path computation unit; and after receiving the route inquiry request transmitted by the path computation unit, the traffic path incorporation unit searches its own records to find a failed traffic connection corresponding to the route inquiry request.

S309, the traffic path incorporation unit determines whether a corresponding failed traffic connection is found, if yes, then executes S310; otherwise executes S313.

S310, the traffic path incorporation unit determines whether there is an updated route already computed for the failed traffic connection, if yes, then executes S311; otherwise executes S312.

S311 includes to return an information about the updated route corresponding to the failed traffic connection, and then to exit.

S312, the traffic path incorporation unit makes an overtime timer enter a waiting state until any one of three cases of, having computed the updated route, failing to compute the updated route or overtime of the timer, occur, then exit.

S313, when failing to find a corresponding failed traffic connection, the traffic path incorporation unit notifies the path computation unit to compute an updated route and to return, to the corresponding head node which requests the routing inquiry, the information about the updated route computed by the path computation unit.

Besides, after all fault traffic connections in the uniform route computation notification messages are processed, the traffic path incorporation unit notifies the path computation unit to switch the path computation state of the path computation unit to non-traffic fault route inquiry state from the traffic fault route inquiry state.

In the embodiment of the disclosure, Step 306, that is, the traffic path incorporation unit executes incorporating for all pieces of fault connection information according to traffic incorporating and route inquiry statistic algorithm, and uniformly obtains and records the route information from the path computation unit, specifically comprises:

the traffic path incorporation unit processes the received uniform route computation notification message including multiple pieces of fault connection information, separates fault connection information in the uniform route computation notification message one by one, and stores failed traffic connections with non-route policy attribute and weak-route policy attribute in one fault traffic hash table, key values are IDs of source and destination nodes (that is, source node ID and destination node ID) of traffics; the traffic path incorporation unit eliminates failed traffic connections with strong-route policy attribute, when the head node of failed traffic connections with strong-route policy attribute initiates an inquiry subsequently, the recovery route information is directly computed and fed back to the head node by the path computation unit, and no forwarding is executed.

Key values are taken out from the hash table, and the following processing is executed for each key value:

the traffic path incorporation unit inquires a route from the path computation unit according to IDs of source and destination nodes, and requests the path computation unit to return one route including all available wavelengths. When the path computation unit returns one available route, the traffic path incorporating unit analyzes the available route returned by the path computation unit, determines whether the quantity of available wavelengths on the route is larger than or equal to the quantity of fault traffics under the key value, if yes, executes RWA analysis, assigns the occupied wavelength, and in turn fill the route into the recovery route record field of each failed traffic connection in the hash table according to the priority of failed traffic connections, simultaneously, returns wavelengths which are not used to the path computation unit to release resources; otherwise, continues to inquire a route from the path computation unit and requests the path computation unit to return another route including all available wavelengths, until the quantity of available wavelengths on the route is larger than the quantity of fault traffics under the key value, or until there is no route.

For better understanding of methods according to embodiments of the disclosure, a specific network topology will be explained as below.

Figure 4:
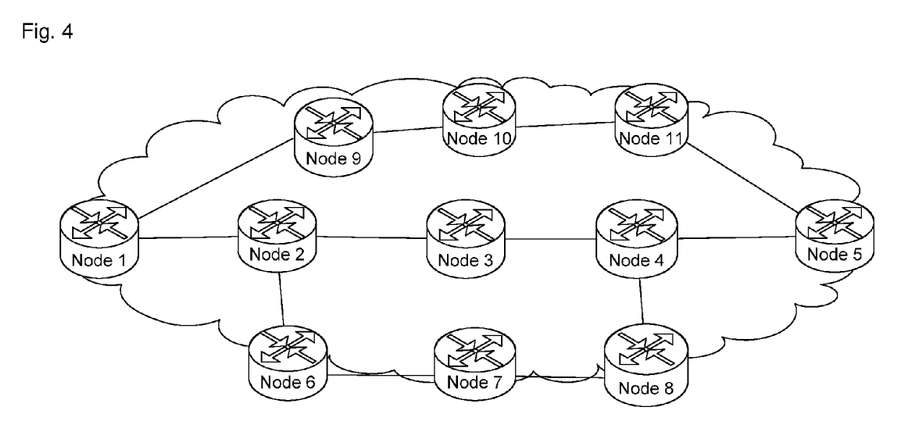
FIG. 4 illustrates a structure diagram of a network topology including eleven nodes, according to an embodiment of the disclosure.

FIG. 4 illustrates a structure diagram of a network topology including 11 nodes, with each link having 5 available wavelengths, namely, $\lambda1, \lambda2, \lambda3, \lambda4$ and $\lambda5$.

There are the following traffics in the network topology:
Traffic 1 with the Route of Node 1- Node 2- Node 3- Node 4- Node 5 and occupying wavelength $\lambda1$;
Traffic 2 with the Route of Node 1- Node 2- Node 3- Node 4- Node 5 and occupying wavelength $\lambda2$;
Traffic 3 with the Route of Node 1- Node 2- Node 3- Node 4- Node 5 and occupying wavelength $\lambda3$;
Traffic 4 with the Route of Node 2- Node 3- Node 4 and occupying wavelength $\lambda4$;
Traffic 5 with the Route of Node 2- Node 3- Node 4- Node 5 and occupying wavelength $\lambda5$;
Traffic 6 with the Route of Node 1- Node 9- Node 10- Node 11- Node 5 and occupying wavelength $\lambda3$;
Traffic 7 with the Route of Node 2- Node 6- Node 7- Node 8- Node 4 and occupying wavelength $\lambda2$;
Traffic 8 with the Route of Node 2- Node 6- Node 7- Node 8- Node 4 and occupying wavelength $\lambda4$; and
Traffic 9 with the Route of Node 2- Node 6- Node 7- Node 8- Node 4 and occupying wavelength $\lambda5$.

Now, it is assumed that optical fiber between Node 3 and Node 4 fails, the Node 4 searches for the traffic connection in fault when detecting that there is a no-light alarm at the transmission port, the influenced traffics are Traffic 1, Traffic 2, Traffic 3, Traffic 4 and Traffic5.

The specific execution process is as follows:

Step a: Node 4 reports to a path computation unit an uniform routing computation notification message carrying information about connections associated with failed traffics 1-5.

Step b: The path computation unit forwards the uniform routing computation notification message to a traffic path incorporation unit, and at the same time, sets its own routing computation state as traffic-failure-routing-inquiry state.

Step c: The traffic path incorporation unit picks up information about connections associated with failed traffics according to a traffic incorporation and routing inquiry statistic algorithm, and stores picked-up in a hash table source and destination nodes of connections associated with failed traffics by using the as key values, as specifically shown in Table 1.

TABLE 1

Hash Table for Traffic Incorporating and Route Inquiry Statistic Algorithm

| Record 1: Source: 1, Destination: 5 | Record 2: Source: 2, Destination: 4 | Record 3: Source: 2, Destination: 5 |
|---|---|---|
| Connection ID: 1 | Connection ID: 4 | Connection ID: 5 |
| Recovery route: None | Recovery route: None | Recovery route: None |
| Recovery wavelength: None | Recovery wavelength: None | Recovery wavelength: None |
| Connection ID: 2 | | |
| Recovery route: None | | |
| Recovery wavelength: None | | |
| Connection ID: 3 | | |
| Recovery route: None | | |
| Recovery wavelength: None | | |

Step d: Record 1, Record 2 and Record 3 are taken out from the hash table in turn, and the following process is executed for each record:

Record 1 is taken out from the hash table and a route is inquired from the path computation unit, and the path computation unit returns one available route: Node 1- Node 9- Node 10- Node 11- Node 5, with four available wavelengths: λ1, λ2, λ4 and λ5; it is determined whether the quantity of available wavelengths on the available route is larger than or equal to the quantity of failed traffic connections under the key value in the hash table, it can found that the quantity 4 of available wavelengths is larger than the quantity 3 of failed traffic connections, therefore, through the RWA process, the recovery connection wavelength λ1 is assigned to the failed traffic connection 1, the recovery connection wavelength λ2 is assigned to the failed traffic connection 2, the recovery connection wavelength λ4 is assigned to the failed traffic connection 3, and simultaneously the wavelength λ5 is released and fed to the path computation unit in order to release resources.

Then, Record 2 is taken out from the hash table and a route is inquired from the path computation unit, and the path computation unit returns one available route: Node 2- Node 6- Node 7- Node 8- Node 4, with two available wavelengths, i.e., λ1 and λ3; it is determined whether the quantity of available wavelengths on the available route is larger than or equal to the quantity of failed traffic connections under the key value in the hash table (it can found that the quantity 2 of available wavelengths is larger than the quantity 1 of failed traffic connections), therefore, through the RWA process, the recovery connection wavelength λ1 is assigned to the failed traffic connection 4, and simultaneously the wavelength λ3 is released and fed to the path computation unit in order to release resources.

Then, Record 3 is taken out from the hash table and a route is inquired from the path computation unit, and the path computation unit returns one available route: Node 2- Node 6- Node 7- Node 8- Node- Node 4, with one available wavelength λ3; it is determined whether the quantity of available wavelengths on the available route is larger than or equal to the quantity of failed traffic connections under the key value in the hash table (it can found that the quantity 1 of available wavelengths is equal to the quantity 1 of failed traffic connections), therefore, through the RWA process, the wavelength λ1 is assigned to the failed traffic connection 5 for recovery connection.

After completion, the record is shown as Table 2.

TABLE 2

Hash Table after Completion of Traffic Incorporating and Route Inquiry Statistic Algorithm

| Record 1: Source: 1, Destination: 5 | Record 2: Source: 2, Destination: 4 | Record 3: Source: 2, Destination: 5 | Route ID: 1 |
|---|---|---|---|
| Connection ID: 1 | Connection ID: 4 | Connection ID: 5 | Actual route: 1 → 9 → 10 → 11 → 5<br>Available wavelength: four: λ1, λ2, λ4 and λ5 |
| Recovery route: 1 | Recovery route: 2 | Recovery route: 3 | |
| Recovery wavelength: λ1 | Recovery wavelength: λ1 | Recovery wavelength: λ3 | Route ID: 2 |
| Connection ID: 2 | | | Actual route: 2 → 6 → 7 → 8 → 4 |
| Recovery route: 1 | | | Available wavelength: two: λ1 and λ3 |
| Recovery wavelength: λ2 | | | |
| Connection ID: 3 | | | Route ID: 3 |
| Recovery route: 1 | | | Actual route: 2 → 6 → 7 → 8 → 4 → 5 |
| Recovery wavelength: λ4 | | | Available wavelength: one: λ3 |

Step e: When Node 1 starts to request recovery path computation for Traffic 1, Node 1 forwards the route inquiry request to the traffic path incorporation unit through the path computation unit, the traffic path incorporation unit finds the connection with ID of 1 in Table 2 according to the route inquiry request, and returns the recovery route of the connection, namely, route with ID of 1: 1→9→10→11→5, and the recovery wavelength λ1 to Node 1 through the path computation unit.

When Node 1 starts to request recovery path computation for Traffic 2, Node 1 forwards the route inquiry request to the traffic path incorporation unit through the path computation unit, the traffic path incorporation unit finds the connection with ID of 2 in Table 2 according to the route inquiry request, and returns the recovery route of the connection, namely, route with ID of 1: 1→9→10→11→5, and the recovery wavelength λ2 to Node 1 through the path computation unit.

When Node 1 starts to request recovery path computation for Traffic 3, Node 1 forwards the route inquiry request to the traffic path incorporation unit through the path computation unit, the traffic path incorporation unit finds the connection with ID of 3 in Table 2 according to the route inquiry request, and returns the recovery route of the connection, namely, route with ID of 1: 1→9→10→11→5, and the recovery wavelength λ4 to Node 1 through the path computation unit.

As the same way, when Node 2 starts to request recovery path computation for Traffic 4, Node 2 forwards the route inquiry request to the traffic path incorporation unit through the path computation unit, the traffic path incorporation unit finds the connection with ID of 4 in Table 2 according to the route inquiry request, and returns the recovery route of the connection, namely, route with ID of 2: 2→6→7→8→4, and the recovery wavelength λ1 to Node 2 through the path computation unit.

Similarly, when Node 2 starts to request recovery path computation for Traffic 5, Node 2 forwards the route inquiry request to the traffic path incorporation unit through the path computation unit, the traffic path incorporation unit finds the connection with ID of 5 in Table 2 according to the route inquiry request, and returns the recovery route of the connection, namely, route with ID of 3: 2→6→7→8→4→5, and the recovery wavelength λ3 to Node 2 through the path computation unit.

Step f: When completing the processing of the five fault traffics, the path incorporation unit notifies the path computation unit to switch to non-traffic fault route inquiry state from the traffic fault route inquiry state.

In conclusion, the embodiments of the disclosure provide apparatus and methods for rerouting multiple traffics, compared with the related technologies, in the embodiments of the disclosure, as multiple fault servers are incorporated and only routes corresponding to the incorporating quantity need to be computed, the computation time of the path computation unit is reduced, the burden of the path computation unit is lightened, the efficiency of multi-traffic restoration is improved, and the quick response of traffic recovery is guaranteed.

Above contents are just preferred specific implementation ways of the disclosure, the protection scope of the disclosure is not limited hereto; and any changes or replacements, which are easily made by technicians familiar with the technical field within the technical scope disclosed in the disclosure, should be included within the protection scope of the disclosure. Therefore, the protection scope of the disclosure should be subject to that applied in claims.

The invention claimed is:

1. An apparatus for rerouting multiple traffics, comprising a path computation unit and a traffic path incorporation unit, wherein the path computation unit is configured:
to forward, to the traffic path incorporation unit, a received uniform route computation notification message including information about a plurality of failed traffic connections; and
to forward, to the traffic path incorporation unit, a route inquiry request sent by a head node of a failed traffic during a traffic failure inquiry period;

the traffic path incorporation unit is configured:
to receive the uniform route computation notification message forwarded by the path computation unit, to incorporate the plurality of failed traffic connections according to a traffic incorporation and route inquiry statistic algorithm, to obtain, from the path computation unit, updated routes with respect to the plurality of failed traffic connections as incorporated, and to store records of the updated routes; and
based on the received route inquiry request forwarded by the path computation unit, to search the records to find a corresponding updated route, and to return, through the path computation unit, the found updated route to the head node requesting route restoration.

2. The apparatus according to claim 1, further comprising:
a traffic failure reporting unit arranged in a node of an automatic switched optical network, configured to, when detecting a multiplexing alarm occurs at a transmission port of the node, determine whether a number of the plurality of failed traffic connections is larger than a predetermined threshold, and when determining that the number of the failed traffic connections is larger than the predetermined threshold, to send, to the path computation unit, a uniform route computation notification message including information about the plurality of failed traffic connections.

3. The apparatus according to claim 1, wherein the path computation unit comprises a message forwarding module, a route inquiry request forwarding module and an updated route information forwarding module, wherein the message forwarding module is configured to forward, to the traffic path incorporation unit, the received uniform route computation notification message including information about the plurality of failed traffic connections, and at the same time, to set the route computation state of the path computation unit as traffic-failure-route-inquiry;

the route inquiry request forwarding module is configured:
to receive the route inquiry request sent by the head node of the failed traffic; and
to determine the current route computation state of the path computation unit, and when determining the path computation unit is currently in a route computation state of traffic-failure-route-inquiry, then to forward, to the traffic path incorporation unit, the route inquiry request reported by the head node, otherwise to trigger the path computation unit to directly compute a corresponding updated route according to the received route inquiry request;

the route information forwarding module is configured to forward, to the head node requesting route restoration, the updated route found by the traffic path incorporation unit according to the route inquiry request.

4. The apparatus according to claim 1, wherein the traffic path incorporation unit comprises a storage module, a route restoration module and an inquiry module, wherein the storage module is configured to separate, from the uniform route computation notification message, information about all the failed traffic connection, and store the failed traffic connections in a hash table with source and destination nodes of the failed traffic connections as key values;

the route restoration module is configured to take out the key values from the hash table, and to respectively execute the following processing for each key value:
to request the path computation unit to return an updated route including all available wavelengths, to assign each failed traffic connection a wavelength, and to fill the updated route in a route restoration record field of each failed traffic connection in the hash table;

the inquiry module is configured to search the hash table according to the route inquiry request forwarded by the path computation unit, and when a corresponding failed traffic connection is found, to return, through the path computation unit, an updated route corresponding to the failed traffic connection to corresponding head nodes.

5. The apparatus according to claim 4, wherein the route restoration module is configured to take out the key values from the hash table and to respectively execute the following processing for each key value:

to request the path computation unit to return an route including all available wavelengths, to analyze the route returned by the path computation unit to determine whether a number of the available wavelengths of the route is larger than or equal to a number of failed traffic connections associated with the key value, if yes, then to execute a route and wavelength assignment analysis, and to fill the route into updated route record field of each failed traffic connection in the hash table according to priority of those failed traffic connections; otherwise, to continue to request the path computation unit to return another route including all available wavelengths, until a number of available wavelengths of the another route is larger than or equal to the number of failed traffic connections associate with the key value, or until there is no route.

6. The apparatus according to claim 4, wherein the inquiry module is configured to search the hash table according to the route inquiry request forwarded by the path computation unit, and when a corresponding failed traffic connection is found, to return a corresponding updated route to the path computation unit.

7. A method for rerouting multiple traffics, comprising:
step A, a path computation unit forwarding, to a traffic path incorporation unit, a received uniform route computation notification message including information about a plurality of failed traffic connections;
step B, the traffic path incorporation unit receiving the uniform route computation notification message including information about the plurality of failed traffic connections, incorporating the plurality of failed traffic connections according to a traffic incorporation and route inquiry statistic algorithm, and obtaining, from the path computation unit, updated routes with respect to the plurality of failed traffic connections as incorporated, and storing records of the updated routes;
step C, during a traffic failure inquiry period, the traffic path incorporation unit forwarding, to the traffic path incorporation unit, a route inquiry request sent by a head node of a failed traffic, and the traffic path incorporation unit, based on the received route inquiry request, searching the records to find a corresponding updated route, and returning, through the path computation unit, the found updated route to the head node requesting route restoration.

8. The method according to claim 7, the step A comprises:
step A1, when a link in an automatic switched optical network fails, a node corresponding to the failed link determining whether a number of failed traffic connections is larger than a predetermined threshold, and when determining that the number of the failed traffic connections is larger than the predetermined threshold, to execute step A2;
step A2, sending, to the path computation unit, a uniform route computation notification message including information about the failed traffic connections;
step A3, the path computation unit forwarding, to the traffic path incorporation unit, the received uniform route computation notification message, and at the same time, to setting its own route computation state as traffic-failure-route-inquiry.

9. The method according to claim 7, the step B comprises:
Step B1, the traffic path incorporation unit separating, from the uniform route computation notification message, information about all the failed traffic connection, and storing the failed traffic connections in a hash table with source and destination nodes of the failed traffic connections as key values;
Step B2, the route restoration module taking out the key values from the hash table, and respectively executing the following processing for each key value:
requesting the path computation unit to return an updated route including all available wavelengths, assigning each failed traffic connection a wavelength, and filling the updated route in a route restoration record field of each failed traffic connection in the hash table.

10. The method according to claim 9, step B1 comprises:
the traffic path incorporation unit separating, from the uniform route computation notification message, information about all the failed traffic connection, and, according to route policy attributes of the failed traffic connections, storing failed traffic connections with non-route policy attributes and failed traffic connections with weak-route policy attributes in the hash table, with the source and destination nodes of those failed traffic connections as key values.

11. The method according to claim 9, step B2 comprises:
taking out the key values from the hash table, and to respectively execute the following processing for each key value:
requesting the path computation unit to return an route including all available wavelengths;
analyzing the route returned by the path computation unit to determine whether a number of the available wavelengths of the route is larger than or equal to a number of failed traffic connections associated with the key value, if yes, then executing a route and wavelength assignment analysis, and filling the route into updated route record field of each failed traffic connection in the hash table according to priority of those failed traffic connections; otherwise, continuing to request the path computation unit to return another route including all available wavelengths, until a number of available wavelengths of the another route is larger than or equal to the number of failed traffic connections associate with the key value, or until there is no route.

12. The method according to claim 7, wherein Step C specifically comprises:
C1, when the head node of the failed traffic starts to request route restoration, the path computation unit, if being in a traffic-failure-route-inquiry state, forwarding the route inquiry request reported by the head node to the traffic path incorporation unit and executing step C2; otherwise, directly computing an updated route according to the received route inquiry request;
C2, the traffic path incorporation unit searching to find a corresponding failed traffic connection according to the route inquiry request, and returning, through the path computation unit, the found updated route associated with the failed traffic connection to the head node requesting restoration.

13. The apparatus according to claim 2, wherein the traffic path incorporation unit comprises a storage module, a route restoration module and an inquiry module, wherein
the storage module is configured to separate, from the uniform route computation notification message, information about all the failed traffic connection, and store the failed traffic connections in a hash table with source and destination nodes of the failed traffic connections as key values;
the route restoration module is configured to take out the key values from the hash table, and to respectively execute the following processing for each key value:
to request the path computation unit to return an updated route including all available wavelengths, to assign each failed traffic connection a wavelength, and to fill the updated route in a route restoration record field of each failed traffic connection in the hash table;
the inquiry module is configured to search the hash table according to the route inquiry request forwarded by the path computation unit, and when a corresponding failed traffic connection is found, to return, through the path computation unit, an updated route corresponding to the failed traffic connection to corresponding head nodes.

14. The apparatus according to claim 3, wherein the traffic path incorporation unit comprises a storage module, a route restoration module and an inquiry module, wherein
the storage module is configured to separate, from the uniform route computation notification message, information about all the failed traffic connection, and store the failed traffic connections in a hash table with source and destination nodes of the failed traffic connections as key values;
the route restoration module is configured to take out the key values from the hash table, and to respectively execute the following processing for each key value:
to request the path computation unit to return an updated route including all available wavelengths, to assign each failed traffic connection a wavelength, and to fill the updated route in a route restoration record field of each failed traffic connection in the hash table;
the inquiry module is configured to search the hash table according to the route inquiry request forwarded by the path computation unit, and when a corresponding failed traffic connection is found, to return, through the path computation unit, an updated route corresponding to the failed traffic connection to corresponding head nodes.

15. The apparatus according to claim 13, wherein the route restoration module is configured to take out the key values from the hash table and to respectively execute the following processing for each key value:
to request the path computation unit to return an route including all available wavelengths,
to analyze the route returned by the path computation unit to determine whether a number of the available wavelengths of the route is larger than or equal to a number of failed traffic connections associated with the key value, if yes, then to execute a route and wavelength assignment analysis, and to fill the route into updated route record field of each failed traffic connection in the hash table according to priority of those failed traffic connections; otherwise, to continue to request the path computation unit to return another route including all available wavelengths, until a number of available wavelengths of the another route is larger than or equal to the number of failed traffic connections associate with the key value, or until there is no route.

16. The apparatus according to claim 14, wherein the route restoration module is configured to take out the key values from the hash table and to respectively execute the following processing for each key value:
to request the path computation unit to return an route including all available wavelengths,
to analyze the route returned by the path computation unit to determine whether a number of the available wavelengths of the route is larger than or equal to a number of failed traffic connections associated with the key value, if yes, then to execute a route and wavelength assignment analysis, and to fill the route into updated route record field of each failed traffic connection in the hash table according to priority of those failed traffic connections; otherwise, to continue to request the path computation unit to return another route including all available wavelengths, until a number of available wavelengths of the another route is larger than or equal to the number of failed traffic connections associate with the key value, or until there is no route.

17. The apparatus according to claim 13, wherein the inquiry module is configured to search the hash table according to the route inquiry request forwarded by the path computation unit, and when a corresponding failed traffic connection is found, to return a corresponding updated route to the path computation unit.

18. The apparatus according to claim 14, wherein the inquiry module is configured to search the hash table according to the route inquiry request forwarded by the path computation unit, and when a corresponding failed traffic connection is found, to return a corresponding updated route to the path computation unit.

19. The method according to claim 8, the step B comprises:
Step B1, the traffic path incorporation unit separating, from the uniform route computation notification message, information about all the failed traffic connection, and storing the failed traffic connections in a hash table with source and destination nodes of the failed traffic connections as key values;
Step B2, the route restoration module taking out the key values from the hash table, and respectively executing the following processing for each key value:
requesting the path computation unit to return an updated route including all available wavelengths, assigning each failed traffic connection a wavelength, and filling the updated route in a route restoration record field of each failed traffic connection in the hash table.

20. The method according to claim 19, step B1 comprises:
the traffic path incorporation unit separating, from the uniform route computation notification message, information about all the failed traffic connection, and, according to route policy attributes of the failed traffic connections, storing failed traffic connections with non-route policy attributes and failed traffic connections with weak-route policy attributes in the hash table, with the source and destination nodes of those failed traffic connections as key values.

21. The method according to claim 19, step B2 comprises:
taking out the key values from the hash table, and to respectively execute the following processing for each key value:
requesting the path computation unit to return an route including all available wavelengths;
analyzing the route returned by the path computation unit to determine whether a number of the available wavelengths of the route is larger than or equal to a number of failed traffic connections associated with the key value, if yes, then executing a route and wavelength assignment analysis, and filling the route into updated route record field of each failed traffic connection in the hash table according to priority of those failed traffic connections; otherwise, continuing to request the path computation unit to return another route including all available wavelengths, until a number of available wavelengths of the another route is larger than or equal to the number of failed traffic connections associate with the key value, or until there is no route.

22. The method according to claim 8, wherein Step C specifically comprises:
C1, when the head node of the failed traffic starts to request route restoration, the path computation unit, if being in a traffic-failure-route-inquiry state, forwarding the route inquiry request reported by the head node to the traffic path incorporation unit and executing step C2; otherwise, directly computing an updated route according to the received route inquiry request;
C2, the traffic path incorporation unit searching to find a corresponding failed traffic connection according to the route inquiry request, and returning, through the path computation unit, the found updated route associated with the failed traffic connection to the head node requesting restoration.

* * * * *